J. R. MARSHALL.
Stalk-Chopper.
No. 29,705. Patented Aug. 21. 1860.
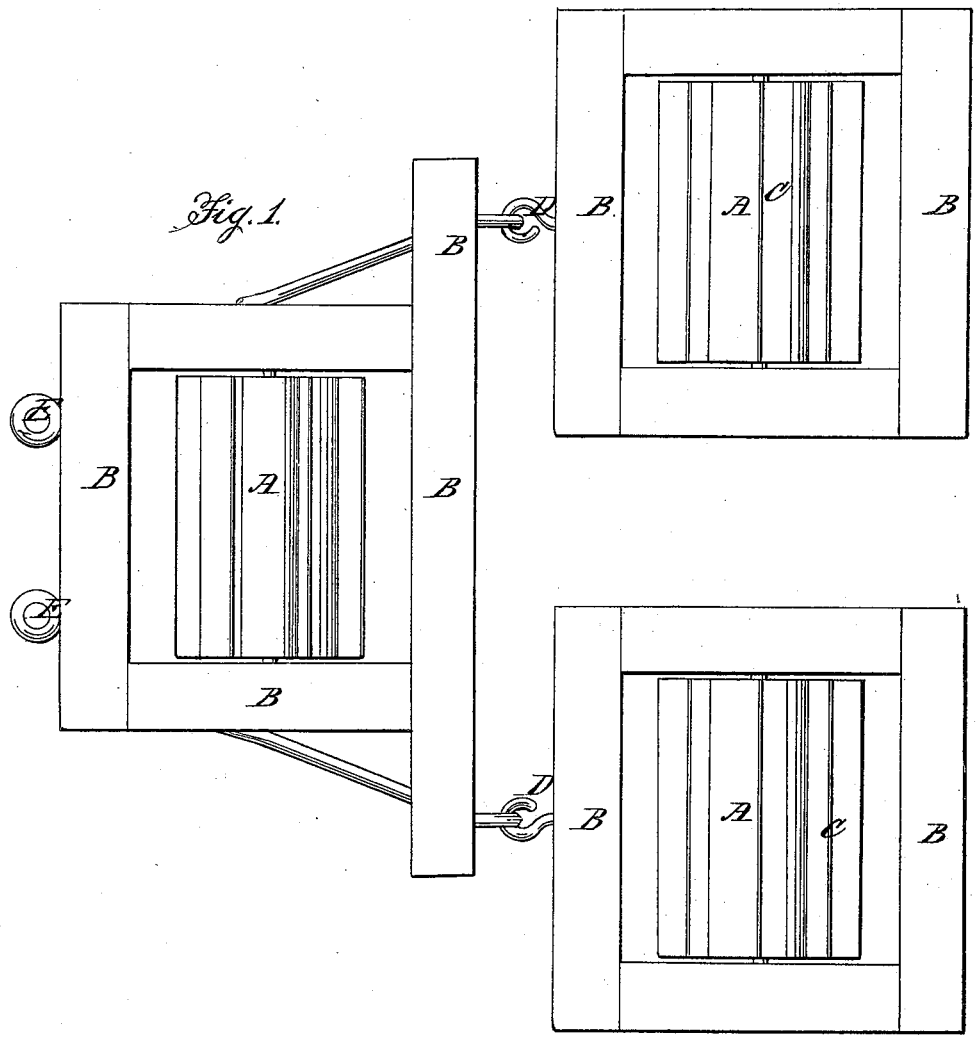
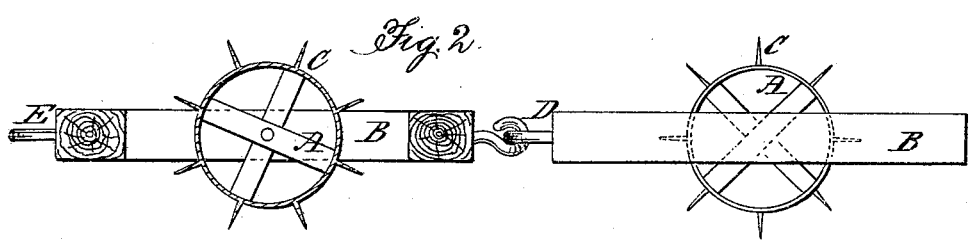

UNITED STATES PATENT OFFICE.

JOHN R. MARSHALL, OF MARINE, ILLINOIS.

IMPROVEMENT IN CORNSTALK-CUTTERS.

Specification forming part of Letters Patent No. 29,705, dated August 21, 1860.

*To all whom it may concern:*

Be it known that I, JOHN R. MARSHALL, of Marine town, in the county of Madison and State of Illinois, have invented a new and useful Improvement in Machines for Cutting Cornstalks and other Litter; and I do hereby declare that the following is a full, clear, and exact description of the same, reference being had to the annexed drawings, making part of this specification, in which—

Figure 1 is a top view of my said invention, and Fig. 2 is a vertical section through the same.

My invention consists of three rollers with knives arranged longitudinally on their peripheries, and in fixing these three rollers in three several frames, and in joining the said frames together by means of links, so that either of the said rollers can rise or fall independent of the others.

The following description of my invention will enable any one skilled in the arts to make and use the same.

Similar letters of reference represent corresponding parts of the different figures of the drawings annexed.

Upon the drawings, A A A represent the rollers, and B the frames in which the said rollers are arranged. Each of the said rollers has a shaft or gudgeon on each end, which fits in journal-boxes made in the frame to receive them, and which form centers about which the rollers revolve.

C represents the knives, arranged longitudinally on the periphery of the rollers.

D represents the links which join the several frames together, and E E are staples to which the horses are attached to draw the machine.

The object in making these rollers separate and arranging them in separate frames, as shown and described, is to enable each roller to adapt itself to the uneven surface of the ground, so that in rolling over three rows of stalks at the time each row will be rolled down and cut off close by the ground, which would not be the case if one long roller were used to effect the same end.

Having thus described the construction and operation of my cornstalk-cutter, what I claim as new therein, and desire to secure by Letters Patent, is—

The use of the three rollers A A A, with knives set longitudinally on their peripheries, in combination with each other, and this I claim not as a combination except when the said rollers are arranged in separate frames, and the said frames are united in relation to each other in the manner shown, and by means of flexible joints, so that the said rollers can follow the uneven surface of the ground, and thus cut the stalks and litter that lie in the hollows and holes thereof.

JOHN R. MARSHALL.

Witnesses:
C. E. GRAY,
R. B. GRAY.